(12) United States Patent
Kopetz

(10) Patent No.: US 11,687,398 B2
(45) Date of Patent: Jun. 27, 2023

(54) METHOD FOR CONTROLLING A TECHNICAL APPARATUS

(71) Applicant: TTTech Auto AG, Vienna (AT)

(72) Inventor: Hermann Kopetz, Krumpendorf (AT)

(73) Assignee: TTTech Auto AG, Vienna (AT)

( * ) Notice: Subject to any disclaimer, the term of this patent is extended or adjusted under 35 U.S.C. 154(b) by 29 days.

(21) Appl. No.: 17/540,511

(22) Filed: Dec. 2, 2021

(65) Prior Publication Data

US 2022/0179725 A1 Jun. 9, 2022

(30) Foreign Application Priority Data

Dec. 7, 2020 (EP) .................................... 20212183

(51) Int. Cl.
| | | |
|---|---|---|
| *G06F 1/08* | (2006.01) | |
| *G06F 11/07* | (2006.01) | |
| *G06F 11/30* | (2006.01) | |

(52) U.S. Cl.
CPC .............. *G06F 11/079* (2013.01); *G06F 1/08* (2013.01); *G06F 11/076* (2013.01); *G06F 11/0772* (2013.01); *G06F 11/3089* (2013.01)

(58) Field of Classification Search
CPC ........ G06F 11/079; G06F 1/08; G06F 11/076; G06F 11/0772; G06F 11/3089
See application file for complete search history.

(56) References Cited

U.S. PATENT DOCUMENTS

| 11,192,562 | B2* | 12/2021 | Mori ..................... B60W 30/18 |
| 2008/0109521 | A1* | 5/2008 | Mousseau ............ G06Q 10/107 |
| | | | 709/206 |
| 2018/0052453 | A1 | 2/2018 | Poledna et al. |
| 2018/0052465 | A1 | 2/2018 | Poledna et al. |
| 2018/0136653 | A1 | 5/2018 | Tao et al. |
| 2020/0125441 | A1 | 4/2020 | Omori et al. |

FOREIGN PATENT DOCUMENTS

| EP | 3557356 A1 * | 10/2019 | ......... G05B 23/0291 |
| EP | 3557356 A1 | 10/2019 | |

OTHER PUBLICATIONS

European Search Report of European Patent Application No. EP 20212183.06 dated May 12, 2021.

* cited by examiner

*Primary Examiner* — Zahid Choudhury
(74) *Attorney, Agent, or Firm* — Eversheds Sutherland (US) LLP

(57) ABSTRACT

The architecture includes four largely independent subsystems which are arranged hierarchically and each form an isolated Fault-Containment Unit (FCU). At the top of the hierarchy is a secure subsystem, the Fault-Tolerant Decision Subsystem, which executes simple software on fault-tolerant hardware. The other three subsystems are insecure because they contain complex software executed on non-fault-tolerant hardware. Experience has shown that it is difficult to find all design errors in a complex software system and to prevent an intrusion. The redundancy and diversity inherent in this architecture masks every error—even a Byzantine error—of an insecure subsystem in such a way that no safety-critical failure can occur.

16 Claims, 3 Drawing Sheets

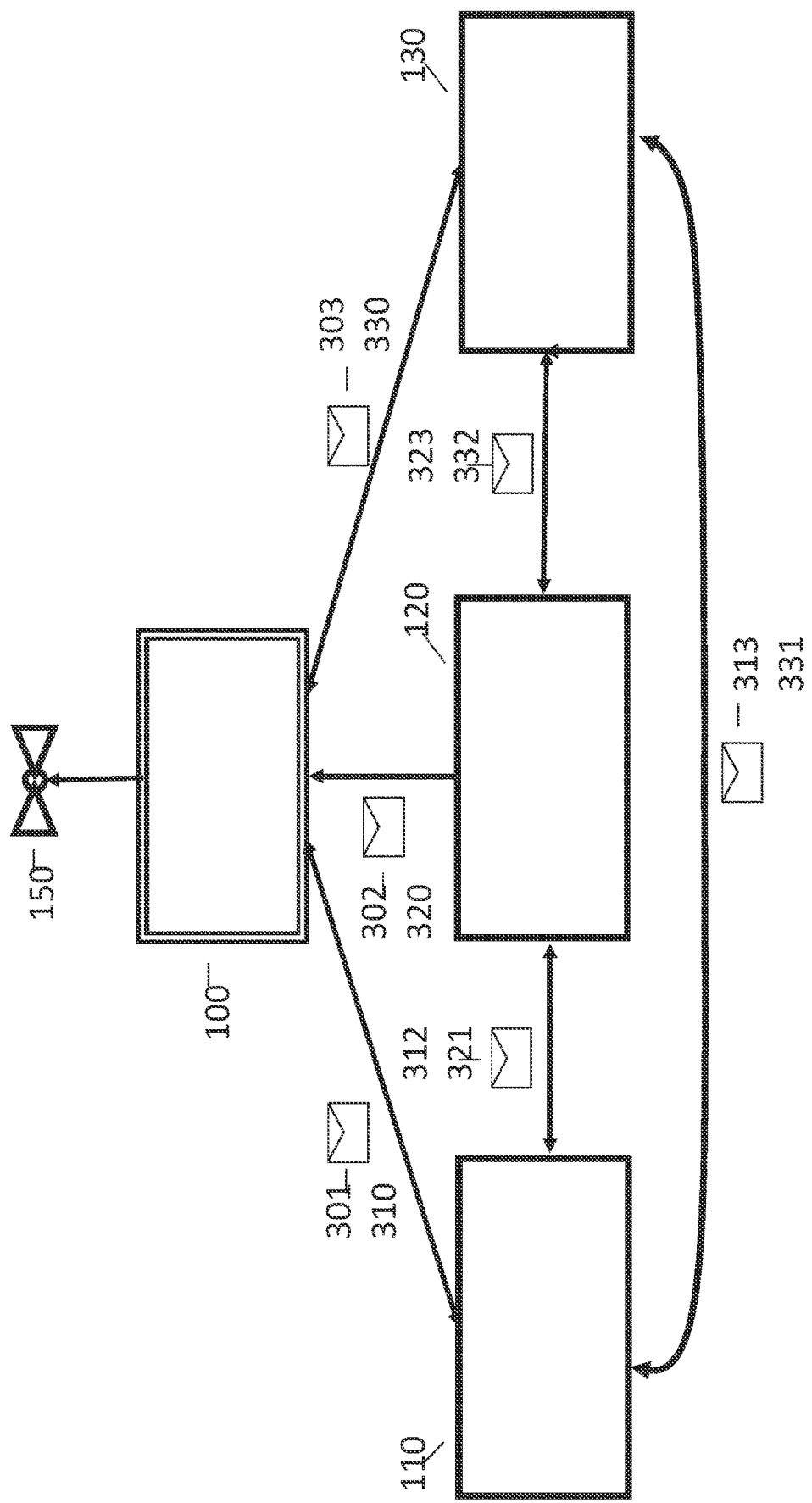

METHOD FOR CONTROLLING A TECHNICAL APPARATUS

CROSS-REFERENCE TO RELATED APPLICATIONS

This application claims priority to and the benefit of European Patent Application No. EP 20212183.06, filed Dec. 7, 2020, which is hereby incorporated by reference herein in its entirety.

FIELD

The invention relates to a method for controlling a technical apparatus, e.g. a technical system, such as a robot or a vehicle, in particular a motor vehicle, with a distributed real-time computer system, wherein the real-time computer system
- comprises subsystems, in particular a plurality of subsystems, wherein, for example, the subsystems are arranged hierarchically,
- and wherein the subsystems are synchronized via a global time, for example by using a time server, which is preferably positioned outside the hierarchy of the subsystems, wherein the time server periodically sends synchronization messages to each subsystem, for example to the clocks of each subsystem, for synchronizing the subsystems or the clocks of the subsystems to establish the global time, and wherein,
- using this global time, the timeline is divided into a sequence of synchronized time slices.

Furthermore, the invention relates to a real-time computer system, in particular a distributed real-time computer system, for controlling a technical apparatus, e.g. a technical system, such as a robot or a vehicle, in particular a motor vehicle, wherein the real-time computer system
- comprises subsystems, in particular a plurality of subsystems, wherein, for example, the subsystems are arranged hierarchically,
- and wherein the subsystems are synchronized via a global time, for example by using a time server, which is preferably positioned outside the hierarchy of the subsystems, wherein the time server is set up to periodically send synchronization messages to each subsystem, for example to the clocks of each subsystem, for synchronizing the subsystems or the clocks of the subsystems for establishing the global time, and wherein,
- using this global time, the timeline is divided into a sequence of synchronized time slices.

The invention is part of the field of computer technology. It describes a method for safe autonomous operation of a technical apparatus, such as a robot or a vehicle, in particular a motor vehicle, and a secure automation system or an architecture of such a secure automation system. In the literature, a system including a technical apparatus and a real-time computer system controlling the apparatus is also referred to as a Cyber-Physical System (CPS).

BACKGROUND

The autonomous operation of a technical apparatus, e.g. a technical system, such as a robot or a vehicle, in particular a motor vehicle, requires a real-time computer system which observes the environment of the technical apparatus, for example of the technical system, by means of sensors, evaluates the sensor data by means of a process model executed on the real-time computer system and transfers the calculated setpoints to the actuators, which influence the course of the physical processes. The observing of the environment can be carried out, for example, by means of optical sensors (camera), LIDAR, radar sensors and various other sensors. The evaluation of the sensor data, the data fusion of the sensor data and the creation of necessary environmental models, as well as the planning of the trajectories, require complex software components with millions of commands.

In many Cyber-Physical Systems, e.g. in the autonomous controlling of a vehicle, an error occurring in the real-time computer system can have serious consequences. Such an error can be triggered by a transient or permanent failure of the hardware of a subsystem or by a defect in the software (design error). In safety-critical applications, it is required that the Mean Time To Fail (MTTF) of a catastrophic system-level failure must be on the order of $10^8$ to $10^9$ hours.

However, a malfunction of the system can also be triggered by an Intrusion. In the case of an Intrusion (a break-in into the system), an Intruder bypasses the Intrusion Detection Mechanisms and takes full control of the system. The intruder can then produce a Byzantine error of the compromised subsystem. "*In information technology, Byzantine errors are those errors in which a system behaves incorrectly in an arbitrary manner*" A Byzantine error is thus the most malicious error that can occur in a system.

The architecture of a secure real-time computer system must ensure that any and all Byzantine errors in one of the complex subsystems of the real-time computer system, whether caused by a random hardware failure, a design flaw in the software, or an intrusion, are recognized and controlled in such a way that no security-relevant incident occurs.

SUMMARY

It is an object of the present invention to specify a solution to is problem.

This object is achieved by means of the aforementioned method in that, according to the invention,
- each subsystem and, if present, the time server, forms its own Fault-Containment Unit, and wherein
- one of the subsystems is a decision subsystem, the so-called Fault-Tolerant Decision Subsystem, FTDSS, which is preferably positioned at the highest level of the hierarchy, wherein the FTDSS is set up to transfer setpoints to actuators in each time slice by means of messages, wherein the Fault-Tolerant Decision Subsystem, FTDSS, is a secure subsystem, i.e. contains simple software executed on fault-tolerant hardware, and wherein
- at least or exactly three Data Processing Subsystems, a Normal Processing Subsystem, NPSS, a Monitor Subsystem, MSS, and a Critical Event Handling Subsystem, CEHSS, are provided, all of which are preferably positioned at the next lower hierarchical level, wherein these at least or exactly three data processing subsystems are set up to capture sensor data by means of sensors from an environment observed by the sensors and to evaluate these sensor data independently of each other, wherein
- the environment is observed by the data processing subsystems at the beginning of each time slice and calculations are carried out during this time slice with the sensor data obtained from the observations of the environment carried out at the beginning of said time slice, the Normal Processing Subsystem, NPSS, is set up to send a set of setpoints for normal operation in a message to the Fault-Tolerant Decision Subsystem, FTDSS, and in a message to the Monitor Subsystem, MSS, during each time slice, preferably at the end of the time slice, and wherein the Critical Event Handling Subsystem, CEHSS, is set up to send a set of setpoints for abnormal operation to the Fault-Tolerant Decision Subsystem, FTDSS, in a message during each time slice, preferably at the end of the time slice, and wherein the Fault-Tolerant Decision Subsystem, FTDSS, is set up to send the two received sets of setpoints for normal operation and abnormal operation to the Monitor Subsystem, MSS, in a message during each time slice and wherein the Monitor Subsystem, MSS, is set up to carry out a review during each time slice whether the set of setpoints for normal operation, which it received from the Normal Processing Subsystem, NPSS, in the message, is compatible with an environmental model calculated by the MSS on the basis of the sensor data from the MSS and ensures safe control of the technical apparatus under normal conditions, and furthermore the Monitor Subsystem, MSS, is set up to carry out a review during each time slice whether the set of setpoints for normal operation, which it has received from the Normal Processing Subsystem, NPSS, in said message, is identical to the corresponding set of setpoints sent by the Normal Processing Subsystem, NPSS, via the Fault-Tolerant Decision Subsystem, FTDSS, to the Monitor Subsystem, MSS, and, if both reviews are positive, to set a correctness indicator, correctness indicator-1, to the value TRUE and, if one of the two checks is negative or both checks are negative, to set the correctness indicator-1 to the value FALSE and to send the correctness indicator-1 or the value of the correctness indicator-1 to the Fault-Tolerant Decision Subsystem, FTDSS, in a message during each time slice, and wherein the Fault-Tolerant Decision Subsystem, FTDSS, makes a decision as follows during each time slice: in the event that the value of the correctness indicator-1 is TRUE, the set of setpoints for normal operation is transferred to the actuators, for example in messages; in the event that the correctness indicator-1 has a value of FALSE or if a message with the correctness indicator-1 expected by the FTDSS is missing, the set of setpoints for abnormal operation is forwarded to the actuators, for example in messages, wherein, in this case, the setpoints for abnormal operation are forwarded to the actuators during the time slices following that point in time until the technical apparatus reaches a safe state.

Furthermore, this object is achieved by means of the aforementioned real-time computer system, wherein, according to the invention, each subsystem and, if present, the time server, forms its own Fault-Containment Unit, and wherein one of the subsystems is a decision subsystem, the so-called Fault-Tolerant Decision Subsystem, FTDSS, which is preferably positioned at the highest level of the hierarchy, wherein the FTDSS is set up to transfer setpoints to actuators in each time slice by means of messages, wherein the Fault-Tolerant Decision Subsystem, FTDSS, is a secure subsystem, i.e. contains simple software executed on fault-tolerant hardware, and wherein at least or exactly three Data Processing Subsystems, a Normal Processing Subsystem, NPSS, a Monitor Subsystem, MSS, and a Critical Event Handling Subsystem, CEHSS, are provided, all of which are preferably positioned at the next lower hierarchical level, wherein these at least or exactly three data processing subsystems are set up to capture sensor data by means of sensors from an environment observed by the sensors and to evaluate these sensor data independently of each other, wherein the environment is observed by the data processing subsystems at the beginning of each time slice and calculations are carried out during this time slice with the sensor data obtained from the observations of the environment carried out at the beginning of said time slice, the Normal Processing Subsystem, NPSS, is set up to send a set of setpoints for normal operation in a message to the Fault-Tolerant Decision Subsystem, FTDSS, and in a message to the Monitor Subsystem, MSS, during each time slice, preferably at the end of the time slice, and wherein the Critical Event Handling Subsystem, CEHSS, is set up to send a set of setpoints for abnormal operation to the Fault-Tolerant Decision Subsystem, FTDSS, in a message during each time slice, preferably at the end of the time slice, and wherein the Fault-Tolerant Decision Subsystem, FTDSS, is set up to send the two received sets of setpoints for normal operation and abnormal operation to the Monitor Subsystem, MSS, in a message during each time slice and wherein the Monitor Subsystem, MSS, is set up to carry out a review during each time slice whether the set of setpoints for normal operation, which it received from the Normal Processing Subsystem, NPSS, in the message, is compatible with an environmental model calculated by the MSS on the basis of the sensor data from the MSS and ensures safe control of the technical apparatus under normal conditions, and furthermore the Monitor Subsystem, MSS, is set up to carry out a review during each time slice whether the set of setpoints for normal operation, which it received, or is receiving, from the Normal Processing Subsystem, NPSS, in said message, is identical to the corresponding set of setpoints sent by the Normal Processing Subsystem, NPSS, via the Fault-Tolerant Decision Subsystem, FTDSS, to the Monitor Subsystem, MSS, and, if both reviews are positive, to set a correctness indicator, correctness indicator-1, to the value TRUE and, if one of the two checks is negative or both checks are negative, to set the correctness indicator-1 to the value FALSE and to send the correctness indicator-1 or the value of the correctness indicator-1 to the Fault-Tolerant Decision Subsystem, FTDSS, in a message during each time slice, and wherein the Fault-Tolerant Decision Subsystem, FTDSS, makes a decision as follows during each time slice: in the event that the value of the correctness indicator-1 is TRUE, the set of setpoints for normal operation is transferred to the actuators, for example in messages; in the event that the correctness indicator-1 has a value of FALSE or if a message with the correctness indicator-1 expected by the FTDSS is missing, the set of setpoints for abnormal operation is forwarded to the actuators, for example in messages, wherein, in this case, the setpoints for abnormal operation are forwarded to the actuators during the time slices following that point in time until the technical apparatus reaches a safe state.

The ISO standard ISO 26262 on functional safety for the development, testing and certification of software in safety-relevant applications in the automotive industry introduces four ASIL (Automotive Safety Integrity Levels) safety levels: ASIL A (lowest safety level), ASIL B, ASIL C and ASIL D (highest safety level). ASIL D describes a very complex software development process that should result in error-free software. NASA's experiences [Dvo09] have shown that it is practically impossible to eliminate all design errors present in a complex software system, i.e. a system with more than 10,000 commands.

We therefore refer to a software system or software which comprises fewer than 10,000 commands and has been developed according to ASIL D to eliminate all design errors, as a simple software system/simple software. It is assumed that a simple software system/simple software developed according to ASIL D is free of design errors.

If a software system or a software is not a simple software system or software, we refer to it as a complex software system or as complex software. A complex software system or software can contain unrecognized design errors, e.g. also Byzantine errors such as those triggered by an intrusion.

According to the invention, the real-time computer system disclosed in the same consists of at least four largely independent subsystems, preferably arranged hierarchically, the design of which is diversified, such that the subsystems can be largely independent of each other and mutually review each other.

The term "largely independent" is intended to express that full independence would require the exclusion of all influencing factors that could act on the subsystems at the same time, such as temperature, cosmic radiation, which can trigger SEU (single event upsets), delay in the event of an accident, power supply, etc. As the realization of totally independent Subsystems is not technically possible, the term largely independent is introduced.

Two redundant software systems are diversified if the given task is solved by independent development teams, with different development tools using different algorithms. Diversified software minimizes the likelihood that a software error will occur simultaneously in both systems in two redundant software systems [Avi85].

We refer to two redundant subsystems as diversified if at least the software used in the subsystems is diversified. A higher degree of diversity is realized if the hardware used in the respective systems is also different.

Furthermore, a fifth subsystem, a time server, is present in the architecture, which time server is preferably outside the hierarchy and periodically sends time signals to the other subsystems to synchronize the clocks of the subsystems and maintain a global time. Using this global time, the timeline is divided into a sequence of synchronized time slices. Normally, a subsystem observes the environment at the beginning of a time slice, using the existing sensors. The scheduled calculations are performed during a time slice. At the end of a time slice, the results of the calculations are made available to the other subsystems by means of messages.

Preferably, a subsystem forms an independent Fault Containment Unit (FCU), [Kop12, p. 136-138]. A subsystem is an FCU if the immediate consequences of all internal error causes are isolated and a defined malfunction of the output messages is specified on the interface. The isolation ensures that two FCUs fail largely independently of each other.

A decision subsystem (Fault-Tolerant Decision Subsystem—FTDSS) is provided, which is preferably positioned at the top of the hierarchy. The FTDSS includes simple software which is executed on fault-tolerant hardware. Fault-tolerant hardware as described in [Kop12, p. 155-157] masks an error occurring in the hardware.

In order to prevent an intrusion into the FTDSS via the Internet, the FTDSS preferably has no access to the Internet technical apparatus. As simple software is executed on fault-tolerant hardware in the FTDSS, and if no access to the Internet is available, it can be assumed that the FTDSS is a secure subsystem which works correctly and achieves a required reliability of fewer than $10^{-8}$ failures/hour. Proving such high reliability requires rigorous system development according to ASIL D with the support of formal methods and would be practically impossible to implement in a complex software system.

Furthermore, three subsystems are provided, which are preferably positioned at the next level of the hierarchy:

A subsystem controlling the technical system, e.g. a vehicle, during normal operation—the Normal Processing Subsystem NPSS. Normal operation is present if all assumptions made in the system design of the NPSS regarding the function of the real-time computer system and its environment are fulfilled, i.e. the mechanics of the technical apparatus and the environment in which the technical apparatus is located. A violation of any of these assumptions is what we call a critical event. A critical event that is not controlled by the NPSS results in abnormal operation.

A subsystem which takes control of the process (e.g. the vehicle) during abnormal operation, i.e. after the occurrence of an event not controlled by the NPSS, and which puts the process (the vehicle) into a safe state—the so-called Critical Event Handling Subsystem CEHSS; and A Monitor Subsystem, i.e. a subsystem that monitors the functioning of the NPSS and CEHSS.

Each of these three subsystems is isolated and autonomous and evaluates the sensor data with diversified software. As each of these three subsystems, or the software executed on these subsystems, comprises well over 10,000 commands, these three subsystems are complex. It is assumed that a complex software system is developed and validated according to ASIL B and that the mean time (MTTF) to the occurrence of an error during operation is $10^{-4}$ Hours.

The architecture described here can control the worst case, namely that a Byzantine error occurs in one of the complex subsystems at a random time. Such a Byzantine error—whether the cause of the failure is a hardware failure, a software failure, or an intrusion—is recognized and controlled by the proposed architecture, especially as the complex subsystems form fault-containment units.

Advantageous embodiments of the method according to the invention and the real-time computer system according to the invention are specified in the dependent claims. In particular, the following features can be realized in the method according to the invention and/or in the real-time computer system according to the invention, each on its own or in any combination:

The Monitor Subsystem, MSS, during each time slice reviews whether the set of setpoints for abnormal operation, which it receives from the Critical Event Handling Subsystem, CEHSS, via the FTDSS, in particular by means of messages, is compatible with the environmental model computed by the MSS on the basis of the MSS sensor data and ensures safe control of the technical apparatus in abnormal operation, and, if this is the case, sets another correctness indicator, the correctness indicator-2, to the value TRUE, and if this is not the case, or if no set of setpoints for abnormal operation was received from the CEHSS, sets the correctness indicator-2 to the value FALSE, and wherein the Monitor Subsystem, MSS, subsequently sends the correctness indicator-2 to the Normal Processing Subsystem, NPSS, and wherein the Normal Processing Subsystem, NPSS, during each time slice reviews whether the correctness indicator-2 received from the Monitor Subsystem, MSS, is set to FALSE and, if this is the case, interrupts the normal control of the technical apparatus and puts the technical apparatus into a safe state.

The Normal Processing Subsystem, NPSS, during each time slice also transmits a planned trajectory for normal operation, in addition to the set of setpoints for normal operation, for example in the message in which it sends the set of setpoints for normal operation to the Monitor Subsystem, MSS.

The time server is fault-tolerant.

The data-processing subsystems are insecure subsystems, i.e. they contain complex software executed on non-fault-tolerant hardware.

The data processing subsystems contain diversified software, for example for calculating or reviewing the setpoints for the actuators and/or for computing an environmental model or models.

Each of the Data Processing Subsystems has its own set of sensors.

Each of the subsystems has its own power supply.

BRIEF DESCRIPTION OF THE DRAWINGS

In the following, the invention is explained in more detail by way of examples on the basis of drawings. In the drawings:

FIG. 3 shows a realization of the clock synchronization by means of the subsystems of the real-time computer system.

DETAILED DESCRIPTION

The following first provides an

Explanation of Terms Used

Figure 1:
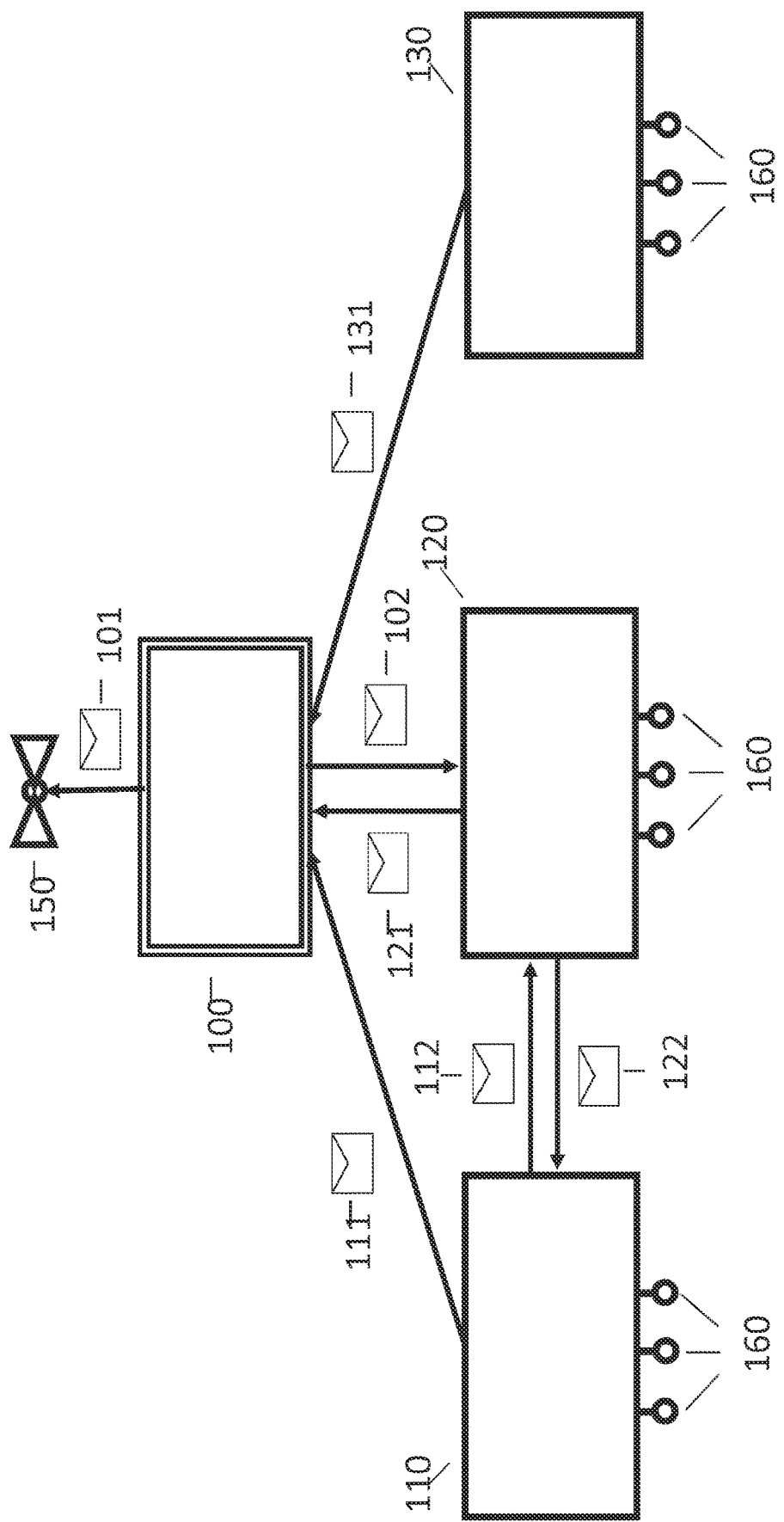
FIG. 1 is an overview of the architecture of the distributed real-time computer system.

In the following, important terms used in this document are explained:

| | |
|---|---|
| Abnormal operation | The operation of a →Cyber-physical System (CPS) (e.g. of a motor vehicle) under conditions that deviate from the specification of the CPS and its environment. |
| ASIL | Automotive Safety Integrity Levels-Safety levels described in the ISO standard ISO 26262 |
| Byzantine error | In information technology, Byzantine errors are those errors in which a system behaves incorrectly in an arbitrary manner [WikIb] |
| Critical Event Handling Subsystem (CEHSS) | A →subsystem which calculates the setpoints for the actuators during →abnormal operation. |
| Cyber-Physical System (CPS) | A system comprising a technical apparatus and a real-time computer system controlling the apparatus. |
| Diversified software | Two software systems are diversified if the given task is solved by independent development teams, with different development tools using different algorithms. Diverse software minimizes the likelihood that a software error will occur simultaneously in two redundant diverse software systems. |
| Simple software | Software which contains fewer than 10,000 commands and is designed according to ASIL D to find all design errors. |
| Fail Silent FCU | An →FCU which does not produce output messages in the event of an error. |
| Fault-Containment Unit (FCU) | A subsystem which isolates the immediate consequences of all internal error causes and specifies a defined malfunction of the output messages on the interface. The isolation ensures that two FCUs fail largely independently of each other. →Fail Silent FCU |
| Fault-Tolerant Decision Subsystem (FTDSS) | A →subsystem which →contains simple software which is executed on fault-tolerant hardware and decides which setpoints are supplied to the actuators. |
| Complex software | Software which comprises more than 10,000 commands or was not developed according to ASIL D. Complex software may contain design errors. |
| Correctness indicator | A variable which can take the value TRUE or FALSE and which indicates whether a result to be reviewed is correct. |
| Critical event | An event that triggers the transition from →normal operation to →abnormal operation. |
| MTTF-Mean Time to Fail | Mean time to occurrence of a failure during the operation of a system. |
| Monitor Subsystem (MSS) | A →subsystem which reviews whether the output values of the →Normal-Processing Subsystem (NPSS) and the →Critical Event Handling Subsystem (CEHSS) ensure safe operation. |

-continued

| | |
|---|---|
| Normal-Processing Subsystem (NPSS) | A →subsystem which calculates the setpoints for the actuators during →normal operation. |
| Normal operation | The operation of a →Cyber-Physical System (CPS) (e.g. of a motor vehicle) under the conditions contained in the specification of the CPS and its environment. |
| Secure subsystem | A →subsystem in which →simple software is executed on fault-tolerant hardware |
| Subsystem | A partial system of a distributed real-time computer system of a →CPS. A subsystem is a largely self-contained unit of hardware and software which computes output data and a new internal state from the input data and the internal state of the subsystem. A subsystem communicates with other subsystems by exchanging messages. |
| Trajectory | Track or motion path of an object |
| Insecure subsystem | A →subsystem in which →complex software is executed or non-fault-tolerant hardware is used. |

FIG. 1 shows the structure of the distributed real-time computer system for controlling a technical apparatus, e.g. a technical system or a machine, such as a robot or a vehicle, in particular a motor vehicle.

As shown in FIG. 1, the real-time computer system comprises subsystems 100, 110, 120, 130, wherein each subsystem has a Fault Containment Unit and the subsystems are preferably arranged in a hierarchy. In this example, the real-time computer system furthermore comprises a time server 210, which is positioned outside said hierarchy, if applicable.

In the real-time computer system, a global time is realized in a known manner, i.e. by means of the time server 210, by means of which the subsystems 100, 110, 120, 130 are synchronized in time. The timeline is divided into time slices, which are time periods of the same duration, which preferably follow each other directly, wherein these time slices are synchronized with each other for all subsystems via the global time, such that respective observed time slices begin and end at the same time in each subsystem.

One of the subsystems, the so-called Decision Subsystem, the Fault-Tolerant Decision Subsystem (FTDSS) 100, which is preferably positioned at the top of the hierarchy, can transfer setpoints to actuators 150 in each time slice by means of a message 101.

Furthermore, three of the subsystems are designed as so-called Data Processing Subsystems, which are preferably positioned on the next lower hierarchy level relative to the FTDSS. Specifically, these data processing subsystems are: the Normal Processing Subsystem (NPSS) 110, the Monitor Subsystem (MSS) 120, and the Critical Event Handling Subsystem (CEHSS) 130. These three data processing subsystems capture the sensor data of an environment by means of sensors 160 and evaluate these sensor data independently of each other, preferably using diversified software.

The Fault-Tolerant Decision Subsystem (FTDSS) 100 is a secure subsystem, i.e. it contains simple software that is executed on fault-tolerant hardware. It is assumed that a secure subsystem meets the given reliability requirements, depending on the specific application, as described above.

The data processing subsystems 110, 120, 130 can be insecure subsystems, i.e. they can contain complex software executed on non-fault-tolerant hardware. It is assumed that a complex software system is developed and validated according to ASIL B and that the mean time (MTTF) to the occurrence of an error during operation is $10^{-4}$ Hours. It cannot be ruled out that a Byzantine error may occur in an insecure subsystem.

The Normal Processing Subsystem (NPSS) 110 observes the environment at the beginning of each time slice with sensors 160, preferably its own, builds an environmental model and computes a set of setpoints for the actuators 150 in normal operation. The setpoints computed by the subsystem 110 are sent to the Fault-Tolerant Decision Subsystem (FTDSS) 100 in a message 111 and to the Monitor Subsystem (MSS) 120 in a message 112. In the event that the subsystem 110 detects that the assumptions about normal operation have been violated, it cancels an ongoing process and puts the technical apparatus into a safe state. In addition, an operator, e.g. the driver of a motor vehicle, can be informed about this and, if necessary, control can be handed over to said operator.

The Critical Event Handling Subsystem (CEHSS) 130 observes the environment at the beginning of each time slice with sensors 160, preferably its own, uses diversified software to build an environmental model and computes a set of setpoints for the actuators 150 in abnormal operation. It sends these setpoints to the Fault-Tolerant Decision Subsystem (FTDSS) 100 in a message 131.

The Fault-Tolerant Decision Subsystem (FTDSS) 100 receives the messages 111, 131 with the setpoints for normal and abnormal operation in every time slice and sends these setpoints to the Monitor Subsystem (MSS) 120 in a message 102.

The Monitor Subsystem (MSS) 120 during each time slice reviews whether the set of setpoints for normal operation, which it received directly from the Normal Processing Subsystem (NPSS) 110 in the message 112, is compatible with an environmental model computed by the MSS 120 using diversified software and based on sensor data determined by means of sensors 160, and whether it ensures safe control of the technical apparatus under normal conditions.

An environmental model is, for example, a digital data structure that at a given time represents the characteristics of the environment of a technical apparatus that are essential for the given task. An example of an environmental model is the description of a road and the objects located on the road at the selected time.

The Monitor Subsystem (MSS) 120 also reviews whether the set of setpoints it receives from the Normal Processing Subsystem (NPSS) 110 in the message 112 is identical to the corresponding set of setpoints which was sent to the Monitor Subsystem (MSS) 120 by the Normal Processing Subsystem (NPSS) 110 via the Fault-Tolerant Decision Subsystem (FTDSS) 100 in the message 120.

This second review is necessary because the following malicious Byzantine error of the Normal Processing Subsystem (NPSS) 110 must be detected: A faulty Normal Processing Subsystem (NPSS) 110 sends correct setpoints to the Monitor Subsystem (MSS) 120 and incorrect setpoints to the Fault-Tolerant Decision Subsystem (FTDSS) 100.

If both reviews performed by the Monitor Subsystem (MSS) 120 are positive, the correctness indicator-1 is set to the value TRUE. If one of the two reviews is negative, the correctness indicator-1 is set to the value FALSE. Following the review, the Monitor Subsystem (MSS) 120 sends the correctness indicator-1 to the Fault-Tolerant Decision Subsystem (FTDSS) 100 in a message 121.

The Fault-Tolerant Decision Subsystem (FTDSS) 100 decides as follows during each time slice: If the correctness indicator-1 contains a value of TRUE, the set of setpoints for normal operation is sent to the actuators 150 in the message 101; if the correctness indicator-1 contains a value of FALSE or if the expected message 121 with the correctness indicator-1 is missing, the set of setpoints for abnormal operation is forwarded to the actuators 150 in the message 101, and from this point on, only setpoints for abnormal operation are sent to the actuators 150 during subsequent time slices until the technical apparatus has achieved a safe state. The absence of the expected message 121 with the correctness indicator-1 is an indicator of the fail-silent failure of the Monitor Subsystem (MSS) 120.

The Fault-Tolerant Decision Subsystem (FTDSS) 100 contains a simple software, in particular a very simple software, which can be realized without the support of operating systems. This is an advantage because experience has shown that operating systems are complex and not free of design errors [Cho01].

The Monitor Subsystem (MSS) 120 must also review during each time slice whether the set of setpoints for abnormal operation, which it receives from the Critical Event Handling Subsystem (CEHSS) 130 via the messages 131, 102, is compatible with the environmental model computed by the MSS based on the sensor data from the sensors 160 of the MSS and ensures safe control of the process in abnormal operation. If this is the case, the Monitor Subsystem (MSS) 120 sets another correctness indicator, the correctness indicator-2, to the value TRUE, and if it is not the case, or if the MSS 120 has received no message from the CEHSS 130 during a time slice, the correctness counter-2 is set to the value FALSE.

The transmission of the setpoints for abnormal operation in the messages 131, 102 via the detour using the FTDSS 100 is necessary to exclude a Byzantine error of the Critical Event Handling Subsystem (CEHSS) 130.

The Monitor Subsystem (MSS) 120 sends the value of the correctness indicator-2 or the correctness indicator-2 to the Normal Processing Subsystem (NPSS) 110 in a message 122, such that it can be communicated to the Normal Processing Subsystem (NPSS) 110 whether an error occurred in the Critical Event Handling Subsystem (CEHSS) 130 or this subsystem failed due to a fail-silent error. The Normal Processing Subsystem (NPSS) 110 reviews during each time slice whether the correctness indicator-2 received from the Monitor Subsystem (MSS) 120 assumes the value FALSE and, if this is the case, the Normal Processing Subsystem (NPSS) 110 puts the technical apparatus into a safe state.

It is advantageous if each of the Data Processing Subsystems 110, 120, 130 performs an analysis of the sensor data, the fusion of the sensor data from the sensors 160 and/or the definition of trajectories by means of diverse software. This reduces the probability that the same software error will occur in multiple subsystems.

A trajectory, for example, is a path that the technical apparatus can execute over time to perform the predefined task. The characteristics of the trajectories of an apparatus depend on the design of the apparatus, the predefined task and the current environmental conditions. For example, a possible path that a vehicle can execute under the given environmental conditions to reach its destination is called a trajectory.

A trajectory can also be described as the temporal sequence of setpoints.

It is advantageous if each of the Data Processing Subsystems 110, 120, 130 has its own set of sensors 160. This prevents an error in one sensor from causing a correlated failure of multiple subsystems.

The Normal Processing Subsystem (NPSS) 110 can send the planned trajectory for normal operation, in addition to the set of setpoints, to the Monitor Subsystem (MSS) 120 in the message 112 during each time slice, to give the Monitor Subsystem (MSS) 120 the opportunity to review the planned trajectories.

Figure 2:
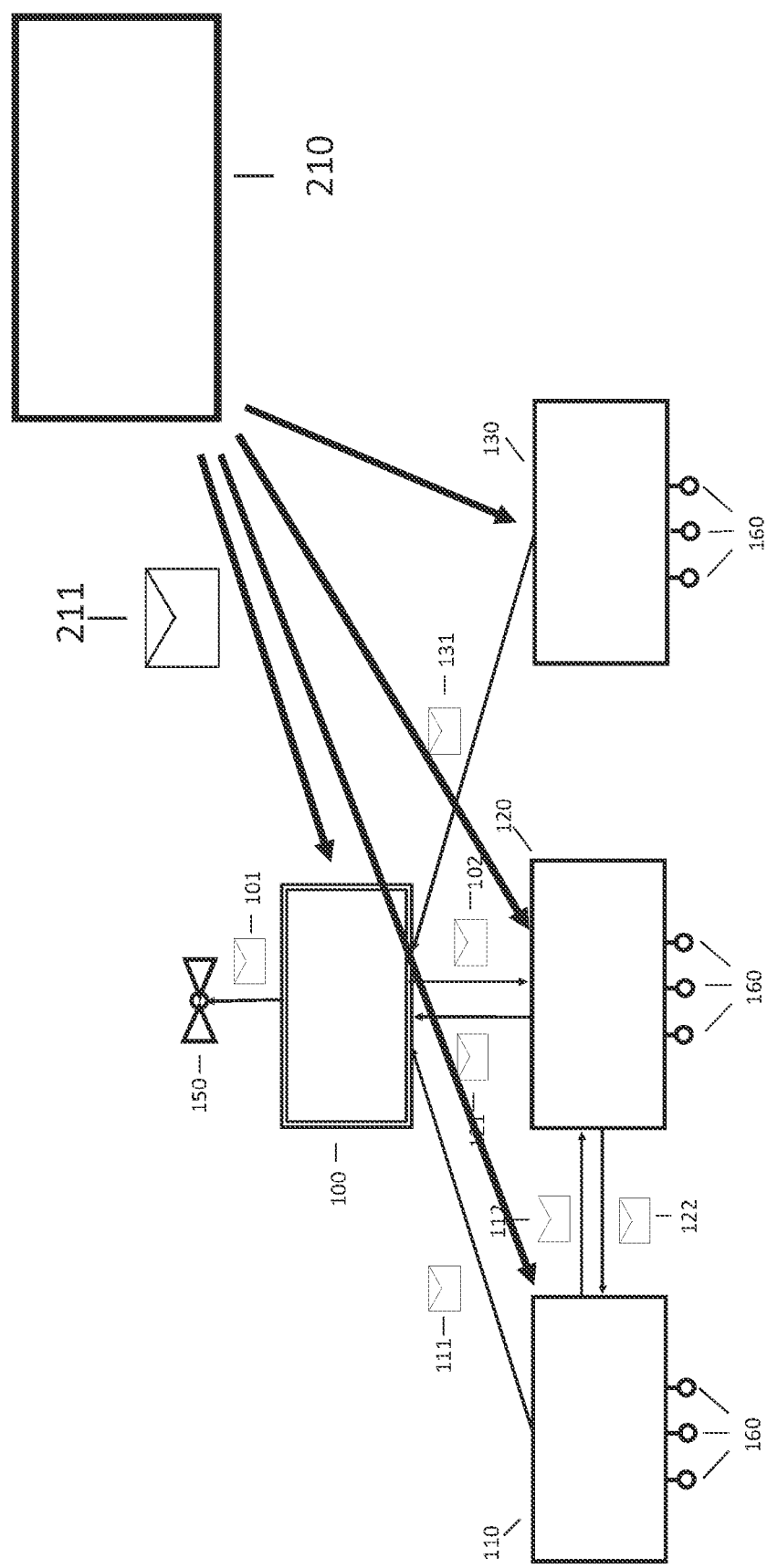
FIG. 2 shows a realization of a clock synchronization by means of a fault-tolerant time server.

FIG. 2 shows a time server 210, as an example of how it can be provided in a real-time computer system from FIG. 1, which periodically sends synchronization messages 211 to the subsystems 100, 110, 120, 130 to synchronize the clocks of the subsystems. It is advantageous if the time server 210 is designed to be fault-tolerant.

As the four subsystems 100, 110, 120, 130 are autonomous FCUs with independent oscillators/clocks, it is also possible to realize a fault-tolerant clock synchronization to establish a global time by means of these four subsystems. FIG. 3 shows the message exchange required to conduct a fault-tolerant clock synchronization, as described in [Kop12, pages 69-74], by means of the four subsystems 100, 110, 120, 130. To do this, the following synchronization messages must be exchanged during each synchronization period:

Synchronization message 301 from the subsystem 100 to the subsystem 110
Synchronization message 310 from the subsystem 110 to the subsystem 100
Synchronization message 302 from the subsystem 100 to the subsystem 120
Synchronization message 320 from the subsystem 120 to the subsystem 100
Synchronization message 303 from the subsystem 100 to the subsystem 130
Synchronization message 330 from the subsystem 130 to the subsystem 100
Synchronization message 312 from the subsystem 110 to the subsystem 120
Synchronization message 321 from the subsystem 120 to the subsystem 110
Synchronization message 323 from the subsystem 120 to the subsystem 130
Synchronization message 332 from the subsystem 130 to the subsystem 120
Synchronization message 313 from the subsystem 110 to the subsystem 130
Synchronization message 331 from the subsystem 130 to the subsystem 110

In general, in order to prevent a failure of a central power supply from causing a failure of all subsystems 100, 110, 120, 130, 210, it is advantageous if each of the subsystems 100, 110, 120, 130, 210 has an independent power supply (e.g. via its own battery).

The following overview concludes by showing how to detect and treat an error or intrusion that occurs in a subsystem.

Error Analysis

Error analysis

| Faulty subsystem or intrusion in | Error detection | Error handling |
|---|---|---|
| Normal-Processing Subsystem | Monitor Subsystem detects errors and reports the error to the Fault-Tolerant Decision System | Fault-Tolerant Decision System switches the apparatus to a safe state |
| Critical Event Handling Subsystem | Monitor Subsystem detects error and reports the error to the Normal-Processing Subsystem | Normal-Processing Subsystem switches the system to a safe state |
| Monitor Subsystem | Fault-Tolerant Decision Subsystem detects the error | Fault-Tolerant Decision System switches the system to a safe state |
| Fault-Tolerant Decision Subsystem | No error detection provided, as simple software on fault-tolerant hardware is free of errors | No error handling provided |

LITERATURE CITED

[Avi85] Avizienis, A. The N-Version Approach to Fault-Tolerant Systems. IEEE Trans. on Software Engineering. Vol. 11, No 12, pp. 1491-1501. 1985.
[Cho01] Chou, A. et al. An Empirical Study of Operating System Errors. Proc. of the ACM SOPS 2001 pp. 73-88. 2001 ISO Standard ISO 26262 on functional safety.
[Dvo09] Dvorak, D. L. Editor. NASA Study on Flight Software Complexity. Final Report. Jet Propulsion Laboratory, Pasadena, Calif. USA. 2009.
[Kop11] Kopetz, H. Real-Time Systems—Design Principles for Distributed Embedded Applications. Springer Verlag. 2011
[WikIb] Wikipedia, Definition von einem byzantinischen Fehler https://de.wikipedia.org/wiki/Byzantinischer_Fehler

The invention claimed is:

1. A method for controlling a technical apparatus with a distributed real-time computer system, wherein the real-time computer system comprises a plurality of subsystems, wherein the subsystems are arranged hierarchically, wherein the subsystems are synchronized via a global time by using a time server (210), which is positioned outside the hierarchy of the subsystems, wherein the time server (210) periodically sends synchronization messages (211) to each subsystem to the clocks of each subsystem for synchronizing the subsystems or the clocks of the subsystems to establish the global time, and wherein, using this global time, the timeline is divided into a sequence of synchronized time slices, the method comprising:

each subsystem (100, 110, 120, 130) and, if present, the time server (210), forms its own Fault-Containment Unit, and wherein one of the subsystems is a decision subsystem, the so-called Fault-Tolerant Decision Subsystem, FTDSS, (100), which is positioned at the highest level of the hierarchy, wherein the FTDSS (100) can transfer setpoints to actuators (150) in each time slice by means of messages (101), wherein the Fault-Tolerant Decision Subsystem, FTDSS, (100) is a secure subsystem, i.e. contains simple software executed on fault-tolerant hardware, and wherein at least or exactly three Data Processing Subsystems, a Normal Processing Subsystem, NPSS, (110), a Monitor Subsystem, MSS, (120), and a Critical Event Handling Subsystem, CEHSS, (130), are provided, all of which are positioned at the next lower hierarchical level, wherein these at least or exactly three Data Processing Subsystems capture sensor data by means of sensors (160) from an environment observed by the sensors (160) and evaluate these sensor data independently of each other, wherein the environment is observed by the Data Processing Subsystems (110, 120, 130) at the beginning of each time slice and calculations are carried out during this time slice with the sensor data obtained from the observations of the environment carried out at the beginning of said time slice, the Normal Processing Subsystem, NPSS, (110) sends a set of setpoints for a normal operation to the Fault-Tolerant Decision Subsystem, FTDSS, (100) in a message (111) and to the Monitor Subsystem, MSS, (120) in a message (112) during each time slice at the end of the time slice, and wherein the Critical Event Handling Subsystem, CEHSS, (130) sends a set of setpoints for abnormal operation to the Fault-Tolerant Decision Subsystem, FTDSS, (100) in a message (131) during each time slice at the end of the time slice, and wherein the Fault-Tolerant Decision Subsystem, FTDSS, (100) sends the two received sets of setpoints for normal operation and abnormal operation to the Monitor Subsystem, MSS, (120) in a message (102) during each time slice at the end of the time slice, and wherein the Monitor Subsystem, MSS, (120) carries out a review during each time slice whether the set of setpoints for normal operation, which it received from the Normal Processing Subsystem, NPSS, (110) in the message (112), is compatible with an environmental model calculated by the MSS (120) on the basis of the sensor data (160) from the MSS (120) and ensures safe control of the technical apparatus under normal conditions, and furthermore the Monitor Subsystem, MSS, (120) carries out a review during each time slice whether the set of setpoints for normal operation, which it received from the Normal Processing Subsystem, NPSS, (110) in said message (112), is identical to the corresponding set of setpoints sent by the Normal Processing Subsystem, NPSS, (110) via the Fault-Tolerant Decision Subsystem, FTDSS, (100) to the Monitor Subsystem, MSS, (120), and, if both reviews are positive, sets a correctness indicator, correctness indicator-1, to the value TRUE and, if one of the two reviews is negative or both reviews are negative, sets the correctness indicator-1 to the value FALSE and sends the correctness indicator-1, or the value of the correctness indicator-1, to the Fault-Tolerant Decision Subsystem, FTDSS, (100) in a message (121) during each time slice, and wherein the Fault-Tolerant Decision Subsystem, FTDSS, (100) makes a decision as follows during each time slice: in the event that the correctness indicator-1 has a value of TRUE, the set of setpoints for normal operation is transferred to the actuators (150) in messages (101); in the event that the correctness indicator-1 has a value of FALSE or if a message (121) with the correctness indicator-1 expected by the FTDSS (100) is missing, the set of setpoints for abnormal operation is forwarded to the actuators (150) in messages (101), wherein, in this case, the setpoints for abnormal operation are forwarded to the actuators (150) during the time slices following that point in time until the technical apparatus reaches a safe state.

2. The method according to claim 1, wherein the Monitor Subsystem, MSS, (120) during each time slice reviews whether the set of setpoints for abnormal operation, which it receives from the Critical Event Handling Subsystem, CEHSS, (130) via the FTDSS (100), in particular by means of messages (131, 102), is compatible with the environmental model computed by the MSS on the basis of the MSS sensor data and ensures safe control of the technical apparatus in abnormal operation, and, if this is the case, sets another correctness indicator, the correctness indicator-2, to the value TRUE, and if this is not the case, or if no set of setpoints for abnormal operation was received from the CEHSS (130), sets the correctness indicator-2 to the value FALSE, and wherein the Monitor Subsystem, MSS, (120) subsequently sends the correctness indicator-2 to the Normal Processing Subsystem, NPSS, (110), and wherein the Normal Processing Subsystem, NPSS, (110) during each time slice reviews whether the correctness indicator-2 received from the Monitor Subsystem, MSS, is set to FALSE and, if this is the case, interrupts the normal control of the technical apparatus and puts the technical apparatus into a safe state.

3. The method according to claim 1, wherein the Normal Processing Subsystem, NPSS, (110) during each time slice also transmits a planned trajectory for normal operation, in addition to the set of setpoints for normal operation in the message (112), in which it sends the set of setpoints for normal operation to the Monitor Subsystem, MSS, (120).

4. The method according to claim 1, wherein the time server is fault-tolerant.

5. The method according to claim 1, wherein the Data Processing Subsystems (110, 120, 130) are insecure subsystems, i.e. they contain complex software executed on non-fault-tolerant hardware.

6. The method according to claim 1, wherein the Data Processing Subsystems (110, 120, 130) contain a diversified software to compute the setpoints for the actuators (150) and/or an environmental model.

7. The method according to claim 1, wherein each of the Data Processing Subsystems (110, 120, 130) has its own set of sensors.

8. The method according to claim 1, wherein each of the subsystems (100, 110, 120, 130, 210) has its own energy supply.

9. A real-time computer system comprising a distributed real-time computer system for controlling a technical apparatus, wherein the real-time computer system comprises subsystems comprising a plurality of subsystems, wherein the subsystems are arranged hierarchically, wherein the subsystems are synchronized via a global time by using a time server (210), which is positioned outside the hierarchy of the subsystems, wherein the time server (210) is set up to periodically send synchronization messages (211) to each subsystem to the clocks of each subsystem for synchronizing the subsystems or the clocks of the subsystems for establishing the global time, and wherein, using this global time, the timeline is divided into a sequence of synchronized time slices, the real-time computer system comprising:

each subsystem (100, 110, 120, 130) and, if present, the time server (210), forms its own Fault-Containment Unit, and wherein one of the subsystems is a decision subsystem, the so-called Fault-Tolerant Decision Subsystem, FTDSS, (100), which is preferably positioned at the highest level of the hierarchy, wherein the FTDSS (100) is set up to transfer setpoints to actuators (150) during each time slice by means of messages (101), wherein the Fault-Tolerant Decision Subsystem, FTDSS, (100) is a secure subsystem, i.e., contains simple software executed on fault-tolerant hardware, and wherein at least or exactly three Data Processing Subsystems, a Normal Processing Subsystem, NPSS, (110), a Monitor Subsystem, MSS, (120), and a Critical Event Handling Subsystem, CEHSS, (130), are provided, all of which are preferably positioned at the next lower hierarchical level, wherein these at least or exactly three Data Processing Subsystems are set up to capture sensor data by means of sensors (160) from an environment observed by the sensors (160) and to evaluate these sensor data independently of each other, wherein the environment is observed by the Data Processing Subsystems (110, 120, 130) at the beginning of each time slice and calculations are carried out during this time slice with the sensor data obtained from the observations of the environment carried out at the beginning of said time slice, the Normal Processing Subsystem, NPSS, (110) is set up to send a set of setpoints for normal operation to the Fault-Tolerant Decision Subsystem, FTDSS, (100) in a message (111) and to the Monitor Subsystem, MSS, (120) in a message (112) during each time slice, preferably at the end of the time slice, and wherein the Critical Event Handling Subsystem, CEHSS, (130) is set up to send a set of setpoints for abnormal operation to the Fault-Tolerant Decision Subsystem, FTDSS, (100) in a message (131) during each time slice, preferably at the end of the time slice, and wherein the Fault-Tolerant Decision Subsystem, FTDSS, (100) is set up to send the two received sets of setpoints for normal operation and abnormal operation to the Monitor Subsystem, MSS, (120) in a message (102) during each time slice, and wherein the Monitor Subsystem, MSS, (120) is set up to carry out a review during each time slice whether the set of setpoints for normal operation, which it received from the Normal Processing Subsystem, NPSS, (110) in the message (112), is compatible with an environmental model calculated by the MSS (120) on the basis of the sensor data (160) from the MSS (120) and ensures safe control of the technical apparatus under normal conditions, and furthermore the Monitor Subsystem, MSS, (120) is set up to carry out a review during each time slice whether the set of setpoints for normal operation, which it received from the Normal Processing Subsystem, NPSS, (110) in said message (112), is identical to the corresponding set of setpoints sent by the Normal Processing Subsystem, NPSS, (110) to the Monitor Subsystem, MSS, (120) via the Fault-Tolerant Decision Subsystem, FTDSS, (100) and, if both reviews are positive, to set a correctness indicator, correctness indicator-1, to the value TRUE and, if one of the two checks is negative or both checks are negative, to set the correctness indicator-1 to the value FALSE and to send the correctness indicator-1 or the value of the correctness indicator-1 to the Fault-Tolerant Decision Subsystem, FTDSS, (100) in a message (121) during each time slice, and wherein the Fault-Tolerant Decision Subsystem, FTDSS, (100) makes a decision as follows during each time slice: in the event that the correctness indicator-1 has a value of TRUE, the set of setpoints for normal operation is transferred to the actuators (150), for example in messages (101); in the event that the correctness indicator-1 has a value of FALSE or if a message (121) with the correctness indicator-1 expected by the FTDSS (100) is missing, the set of setpoints for abnormal operation is forwarded to the actuators (150), for example in messages (101), wherein, in this case, the setpoints for abnormal operation are forwarded to the actuators (150) during the time slices following that point in time until the technical apparatus reaches a safe state.

10. The real-time computer system according to claim 9, wherein the Monitor Subsystem, MSS, (120) is set up to review during each time slice whether the set of setpoints for abnormal operation, which it receives from the Critical Event Handling Subsystem, CEHSS, (130) via the FTDSS (100), in particular by means of messages (131, 102), is compatible with the environmental model computed by the MSS on the basis of the MSS sensor data and ensures safe control of the technical apparatus in abnormal operation, and is set up to, if this is the case, set another correctness indicator, the correctness indicator-2, to the value TRUE, and if this is not the case, or if no set of setpoints for abnormal operation was received from the CEHSS (130), to set the correctness indicator-2 to the value FALSE, and wherein the Monitor Subsystem, MSS, (120) is set up to subsequently send the correctness indicator-2 to the Normal Processing Subsystem, NPSS, (110), and wherein the Normal Processing Subsystem, NPSS, (110) is set up to review during each time slice whether the correctness indicator-2 received from the Monitor Subsystem, MSS, is set to FALSE and, if this is the case, to interrupt the normal control of the technical apparatus and to put the technical apparatus into a safe state.

11. The real-time computer system according to claim 9, wherein the Normal Processing Subsystem, NPSS, (110) during each time slice also transmits a planned trajectory for normal operation, in addition to the set of setpoints for normal operation, for example in the message (112) in which it sends the set of setpoints for normal operation to the Monitor Subsystem, MSS (120).

12. The real-time computer system according to claim 9, wherein the time server is fault-tolerant.

13. The real-time computer system according to claim 9, wherein the Data Processing Subsystems (110, 120, 130) are insecure subsystems, i.e. they contain complex software executed on non-fault-tolerant hardware.

14. The real-time computer system according to claim 9, wherein the Data Processing Subsystems (110, 120, 130) contain a diversified software, for example to compute the setpoints for the actuators (150) and/or an environmental model.

15. The real-time computer system according to claim 9, wherein each of the Data Processing Subsystems (110, 120, 130) has its own set of sensors.

16. The real-time computer system according to claim 9, wherein each of the subsystems (100, 110, 120, 130, 210) has its own energy supply.

\* \* \* \* \*